United States Patent
Mestha

(10) Patent No.: US 7,555,396 B2
(45) Date of Patent: Jun. 30, 2009

(54) METHOD AND SYSTEM TO PERSONALIZE SENSOR CHARACTERIZING REFERENCE DATABASE IN MULTIPLE LED SPECTROPHOTOMETERS

(75) Inventor: Lalit Keshav Mestha, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 745 days.

(21) Appl. No.: 11/086,087

(22) Filed: Mar. 22, 2005

(65) Prior Publication Data

US 2006/0218172 A1 Sep. 28, 2006

(51) Int. Cl.
G01D 18/00 (2006.01)
(52) U.S. Cl. .................................. 702/85; 702/196
(58) Field of Classification Search ............ 702/196
See application file for complete search history.

(56) References Cited

U.S. PATENT DOCUMENTS

| | | |
|---|---|---|
| 5,377,000 A | 12/1994 | Berends |
| 6,195,158 B1 | 2/2001 | Cadell et al. |
| 6,384,918 B1 | 5/2002 | Hubble, III et al. |
| 6,449,045 B1 | 9/2002 | Mestha et al. |
| 6,556,300 B2 | 4/2003 | Tandon et al. |
| 6,556,932 B1 | 4/2003 | Mestha et al. |
| 6,567,170 B2 | 5/2003 | Tandon et al. |
| 6,584,435 B2 | 6/2003 | Mestha et al. |
| 6,587,793 B2 * | 7/2003 | Viassolo et al. .......... 702/27 |
| 6,603,551 B2 | 8/2003 | Mestha et al. |
| 6,621,576 B2 | 9/2003 | Tandon et al. |
| 6,633,382 B2 | 10/2003 | Hubble, III et al. |
| 6,721,692 B2 | 4/2004 | Mestha et al. |
| 2002/0165684 A1 * | 11/2002 | Olson .................... 702/85 |

(Continued)

OTHER PUBLICATIONS

J. H. Correia, M. Bartek and R. F. Wolffenbuttel, "High-Selectivity Single-Chip Spectrometer in Silicon for Operation at Visible Part of the Spectrum", *IEEE Transactions on Electron Devices*, Vo. 47, No. 3, Mar. 2000, pp. 553-559.

(Continued)

*Primary Examiner*—Bryan Bui
*Assistant Examiner*—Jonathan Teixeira Moffat
(74) *Attorney, Agent, or Firm*—Fay Sharpe LLP

(57) ABSTRACT

To generate a reference database for a particular sensor in a multiple LED spectrophotometric system with a reduced number of test measurements taken from training samples, a first set of reflectance reference measurements are generated from a test target on to a reference sensor from a plurality of different LED emissions. A first spectral reconstruction reference matrix is computed by performing an operational characterization of the reference sensor from the first set of reflectance reference measurements. A second set of reflectance reference measurements from the test target is generated from a second subject sensor whose operation is to be personalized by the objective reference database. The second set of reflectance reference measurements are less in number than the first set. A second reconstruction matrix is computed by performing an operational characterization of the subject sensor from the second set of measurements. The second reconstruction matrix is adjusted by relating the second set of reflectance measurements to a set of corresponding reflectance measurements of the reference sensor, whereby the adjusting of the second matrix comprises computing an optimal solution spectral reconstruction matrix for the second sensor. The reference database is generated from the optimal solution spectral reconstruction matrix.

4 Claims, 2 Drawing Sheets

U.S. PATENT DOCUMENTS

Figure 1:
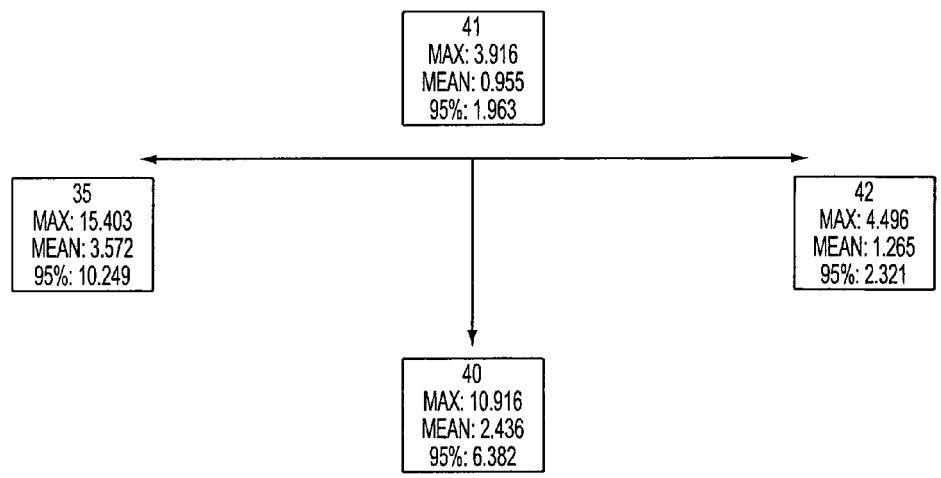

2003/0169421 A1 9/2003 Ehbets
2005/0160092 A1 7/2005 Mestha et al.

OTHER PUBLICATIONS

J. Wallace, "Color sensor enables closed-loop control", *Laser Focus World*, Jun. 2003, pp. 15-16.

A. Okuno et al., "Unique White LED Packaging Systems", 2003 Electronic Components and Technology Conference Proceedings, New Orleans, LA, pp. 15999-1601.

J. Macdonald, "The color-guide, 45/0 Spectrophotometer", Proceedings of the Process and Product Quality Conference and Trade Fair 1998, TAPPI Press, Norcross, Ga, p. 85, 1998.

U. Skarke, "New Instrumentation for color control in textiles", American Dyestuff Report, Jun. 1998.

J. T. DeGroff, "LED Technology in Color Instrument Design", Proceedings of the 53$^{rd}$ Annual Technicl Conference, Boston, MA, 1995, pp. 3280-3283.

C. H. Matamoros G., et al., "Discrete Spectrometry System", Proceedings of the 1994 IEEE LEOS Annual Meeting, pp. 140-141.

M. J. Vrhel, "An LED based spectrophotometric instrument", Proceedings of the SPIE—The International Society for Opti8cal Engineering, Jan. 1999, pp. 226-236.

\* cited by examiner

METHOD AND SYSTEM TO PERSONALIZE SENSOR CHARACTERIZING REFERENCE DATABASE IN MULTIPLE LED SPECTROPHOTOMETERS

Cross-reference is made to copending, commonly assigned applications, U.S. Application No. 2003/0055611 A1, filed Aug. 30, 2001, published Mar. 20, 2003 by Lalit Keshav Mestha, et al., entitled "Systems and Methods For Determining Spectra Using Dynamic Least Squares Algorithms With Measurements From LED Color Sensor" and U.S. application Ser. No. 10/758,096, filed Jan. 16, 2004, by Lalit Keshav Mestha, et al., entitled "Reference Database and Method for Determining Spectra Using Measurements From an LED Color Sensor, and Method of Partitioning a Reference Database", both of which are herein incorporated by reference.

BACKGROUND

The present embodiments relate to spectrophotometer scanning systems particularly suitable for high speed online document color analysis. Such systems must be calibrated and characterized in accordance with the particular operating characteristics of component illumination sources (LEDs) and light reflectance sensors (photodiodes). A reference database cognizant of the particular performance of each sensor in the system is usually utilized for such characterization purposes. The present embodiments especially relate to the formations of such reference databases.

Spectroscopy is the measurement and analysis of electromagnetic radiation absorbed, scattered, or emitted by atoms, molecules, or other chemical or physical materials. Each object affects light in its own unique way. When light waves strike an object, the object's surface absorbs some of the spectrum's energy, while other parts of the spectrum are reflected back from the object. The modified light that is reflected from the object has an entirely news composition of wavelengths. Different surfaces containing various pigments, dyes, and inks generate different but unique wavelength compositions. Light can be modified by striking a reflective object such as paper; or by passing through a transmissive object such as film or a transparency. The pattern of wavelengths that leaves an object is the object's spectral data, which is often called the "finger print" of the object. A typical spectrophotometric system measures the electromagnetic spectrum from 380 nm to 730 nm or so, to cover the humanly visible color spectra or wavelength range, but it can be used to take spectra measurements of colors that cannot be seen by the eye (UV, infrared) which when considered in calibrating the sensor can be useful for even more accurate calibration.

Automatic inline color calibration systems can be much more effective with an inline color measurement system where a spectrophotometer may be mounted in the paper path of the moving copy sheets in the printer, preferably in the output path after fusing or drying, without having to otherwise modify the printer, or interfere with or interrupt normal printing, or the movement of the printed sheets in said paper path, and yet provide accurate color measurements of test color patches printed on the moving sheets as they pass the spectrophotometer. That enables a complete closed loop color control of a printer.

As used herein, unless otherwise specifically indicated, the term "spectrophotometer" may encompass a spectrophotometer, calorimeter, and densitometer, as broadly defined herein.

Sensor-to-sensor inaccuracies occur largely due to differences in LED emission curves; their peak LED wavelengths and full width half max values in the emission spectra; and, it is often difficult to find similar LEDs within a batch. Also, when a sensor is installed on a printer, it may require personalization to improve accuracy due to variations in mounting, ambient and mechanical tolerances. In Table 1 below, some examples of differences between LEDs measured in terms of deltaE between two emission curves of the same type of sensors are shown. For example, when 505 nm LEDs comprise the illumination source, there is a difference in sensed measurement between sensor head 40 and 41 of 10.84 deltaE. The sensors are identified by head numbers. DeltaE is the unit that is normally used to measure the color consistency. It is the color difference unit that uses the Euclidian distance norm to determine the difference between two colors in the color gamut being considered. In ClELab, deltaE equal to one is an indication of high quality print (a just noticeable difference.) In a truly uniform color space, one color difference unit would correspond to the same perceived difference between the two colors. A value of less than 3 deltaE is considered the maximum threshold value that cannot be exceeded for good color quality. Similarly, 470 nm LED and 530 nm LEDs have differences of 43.61 deltaE and 26.63 deltaE respectively. These differences give rise to large variations in accuracy in measurement accuracy.

TABLE 1

| -nm | s35-s41 | s40-s41 | s42-s41 | s38-s41 | s39-s41 | s38-s39 | s40-s42 |
|---|---|---|---|---|---|---|---|
| 430 | 5.99 | 6.57 | 12.49 | 27.65 | 8.65 | 21.53 | 17.84 |
| 470 | 43.61 | 8.24 | 5.70 | 6.16 | 4.39 | 9.16 | 13.89 |
| 505 | 7.73 | 10.84 | 3.70 | 9.19 | 10.41 | 2.34 | 10.98 |
| 530 | 26.63 | 10.81 | 2.63 | 2.40 | 11.91 | 10.85 | 9.22 |
| 565 | 3.73 | 6.34 | 3.81 | 3.23 | 5.50 | 2.46 | 10.10 |
| 590 | 2.91 | 2.21 | 2.18 | 1.42 | 1.50 | 2.58 | 3.65 |
| 620 | 3.92 | 5.23 | 2.54 | 3.94 | 4.66 | 0.77 | 7.74 |
| 660 | 2.11 | 3.43 | 1.98 | 2.39 | 4.05 | 1.82 | 5.37 |

With reference to FIG. 1, comprising a schematic representation of differences in accuracy between selected sensors identified in TABLE 1 and contigously disposed in a spectrophotometric system, it can be seen that sensor 35 measurements are more inaccurate than sensor 41. This difference is due to the large differences in emission spectra from the 470 nm and 530 nm LEDs. Also, the 505 nm and 530 nm LEDs have contributed for sensor 40 errors. In sensor 35, patches with blue spectral content (e.g., cyan patches with magenta, yellow and black set to zero) are illuminated with LEDs with different emission spectra than sensor 41 due to about a 10 nm peak wavelength shift in the blue LED of sensor 35 compared to the blue LED of sensor 41, which can give rise to such measurement errors for blue colors. Given these exemplary problems, one conventional way to correct the problem is by measuring all of the training samples by each sensor during the sensor characterization process and then building therefrom, customized spectral reconstruction matrices for each individual sensor. Unfortunately, the number of training samples used during characterizations for such sensors is very large, e.g. approximately 3000 colors. Such an extensive characterization process would require measuring all the training sample colors by each sensor in the factory/or on the system, which is a highly undesirable solution in terms of the time and cost for completion of such a task.

There is substantial need for an alternative sensor characterization method in which spectral reconstruction matrices are personalized to an acceptable standard of accuracy using a much reduced set and number of training sample colors for each sensor, which can then drastically reduce the time required to customize the reference databases for each sensor.

BRIEF SUMMARY

The methods and systems of the preferred embodiments relate to improving sensor-to-sensor accuracy in multiple LED spectrophotometric systems.

An algorithm comprises a representative construction of the inter-sensor or environmental model for the sensor and comprises a method to create and adjust a reference database utilizing training samples for generating spectral reconstruction matrices.

More particularly, the embodiments comprise a method for personalizing a reference database which is obtained by characterizing the sensor performance in a multiple LED spectrophotometer system with a reference spectrophotometer. A first set of reflectance reference measurements are generated from a test target on to a reference sensor from a plurality of different LED emissions. A first spectral reconstruction reference matrix is computed comprising an operational characterization of the reference sensor from the first set of reflectance reference measurements. A second set of reflectance reference measurements are generated from the test target on to a subject sensor distinct from the reference sensor by operating the sensor in the environment in which it is to be used, which may be a specialized personalization chamber or place, or a substitute printer paper pad. The second set is less in number than the first set. A second spectral reconstruction matrix is computed comprising a subject operational characterization of the subject sensor from the second set of reflectance reference measurements. The second spectral reconstruction matrix is adjusted by relating the second set of reflectance measurements to a set of corresponding reflectance measurements by the reference sensor. The adjusting of the second spectral reconstruction matrix comprises computing an optimal solution spectral reconstruction matrix for the second sensor. The reference database is adjusted from the optimal solution spectral reconstruction matrix to provide an acceptably accurate model of the operation of the subject sensor, without having to go through the large number of training measurements obtained from the reference sensor.

Another aspect of the preferred embodiments comprises computing a personalized spectral reconstruction matrix for characterizing operation of the subject sensor to be personalized by adjusting the first spectral reconstruction matrix in accordance with the optimal solution spectral reconstruction matrix. The first set of reflectance reference measurements from the reference sensor will typically comprise several thousands in number, while the number of reference measurements for the subject sensor will be less than one hundred.

Accordingly, the subject embodiments provide the object and advantage of generating and adjusting a reference database personalized for individual sensors in a multiple LED spectrophotometric system in a manner that avoids having to acquire thousands of training sample measurements per sensor to achieve an acceptably accurate calibration of the system.

These and other objects and advantages will be apparent from the following description of the exemplary embodiments.

DRAWING DESCRIPTIONS

Figure 2:
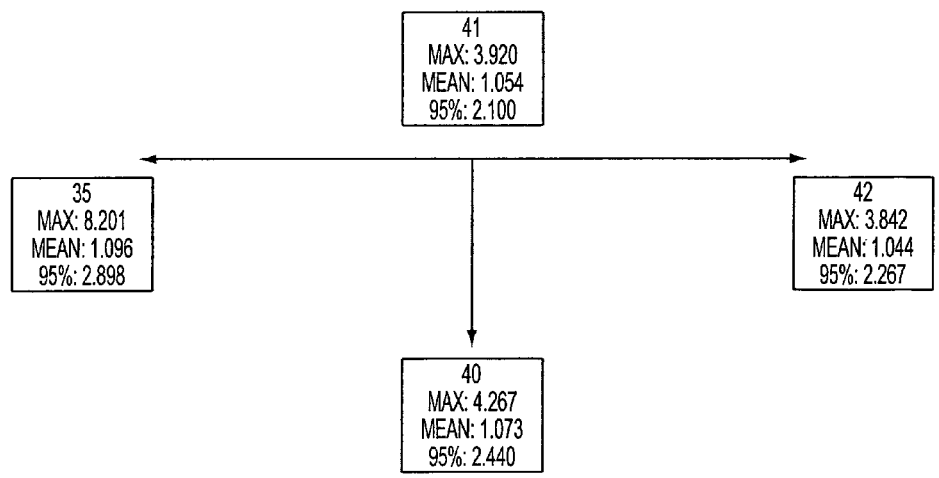
Figure 3:
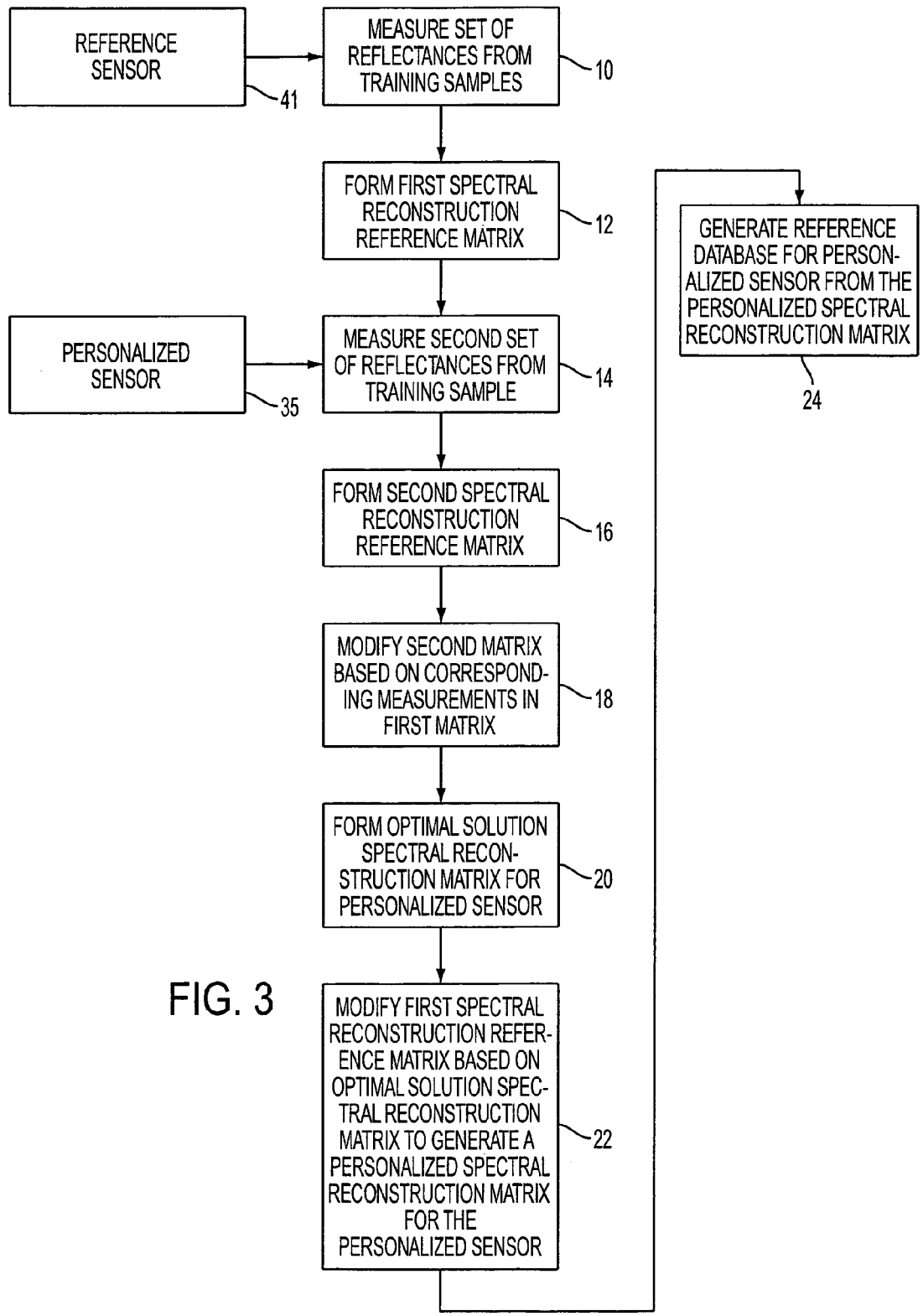

FIG. 1 comprises a schematic representation of sensor-to-sensor accuracy prior to personalization;

FIG. 2 is the same sensor assembly of FIG. 1 except the reference databases for each of the respective sensors have been personalized in accordance with the present embodiments; and, FIG. 3 comprises a block diagram/flowchart identifying the processes of the subject embodiments.

DETAILED DESCRIPTION

As detailed above, operational variations in a spectrophotometric system result from not only variations in photodiodes sensor operation, but also LED emissions for the illuminating light is reflected from a target sample on to the sensor. These variations must be identified and considered in any compensating calibration of the system to achieve an accurately performing spectrophotometric system.

Considering a reference LED sensor whose spectral reconstruction matrices are obtained through a characterization process, then A* can be the representative spectral reconstruction matrix for that sensor. Then, the personalization of each subject sensor begins by measuring a set of personalization patches (reflectance values) with the sensor. This is typically composed of a subset reduced in number (approximately 75) of the reference patch set (approximately 3000, or this set could be even new colors) and then executing a model to adjust the spectral reconstruction matrices of the reference LED sensor.

More particularly and with reference to FIG. 3, assume a value $V_{m'}$ represents a set of 8 LED voltages measured for the corresponding m=1, 2, ..., N colors by the second sensor 35 (subject sensor to be personalized) whose model with respect to a reference LED sensor 41 is to be constructed.

A reference sensor 41 comprises a sensor whose accuracy is known to be very good so that the reflectance measurements obtained from it are known to be acceptably reliable. As shown above with reference to Table 1 and FIG. 1, the sensor-to-sensor accuracy between the reference sensor 41 and the other sensors 35, 40, 42 in the assembly can have unacceptable differences. A reference database for the reference sensor 41 is first formed by measuring 10 the large set of reflectances from training samples, which can involve thousands of measurements. A first spectral reconstruction reference matrix is formed 12 from these measurements as a mathematical representation of the operation of the reference sensor 41. A second set of measurements is obtained 14 from the subject sensor to be personalized, e.g. subject sensor 35, and a second spectral reconstruction reference matrix is formed 16 and mathematically representing the operation of the subject sensor 35. It is an important aspect of the subject embodiments that the number of measurements for the sensor 35 to be personalized are far less than the thousands that need to characterize accurately the reference sensor. The subject embodiments intend to effect the personalization of the second sensor with a far reduced number of measurements, and can even implement a characterization of the subject sensor with only a second set of reflectances having no more than about one hundred measurements. The reduced number of measurements is satisfactory to effect the personalization by identifying the differences between the measurements for particular LED on to the subject sensor 35 from the reference measurements obtained from the reference sensor 41. The intended result is accomplished by mathematically relating the second set of reflectance references from the subject sensor to a set of corresponding reflective measurements obtained from the reference sensor (as will be detailed below). The relating of such differences comprises modifying 18 the second spectral reconstruction reference matrix based on a set of corresponding matrix measurements in the first matrix. The modifying results in the formation 20 of an optimal solution spectral reconstruction matrix for the personalized sensor 35 comprising a mathematical representation more accurately characterizing the operation of the subject sensor 35, in a manner calibrated to the more accurate operation of the reference sensor 41, but only with respect to the reduced number of training sample measurements within the second set of reflectances measured for the subject sensor 35.

The objective personalized reference database for the subject sensor 35 is generated by modifying 22 the first spectral reconstruction reference matrix with the optimal solution spectral reconstruction matrix to generate a personalized spectral reconstruction matrix for the personalized sensor. The personalize spectral reconstruction matrix so computed can then be used to generate 24 the desired reference database for the subject sensor 35 in a manner that is now personalized with respect to the operation of sensor 35 as calibrated by the operation of the reference sensor 41.

The foregoing objectives are mathematically implemented as follows.

The relationship between measured colors of the second sensor 35 and the reference LED sensor 41 outputs can be modeled from the data as follows. To construct an inter-instrument model, we can assume a linear affine, quadratic affine or cubic affine, etc. The following linear model relates the measurement set between two sensors.

$$Z = MV \quad (1)$$

where $Z=[Z_m\ 1]^T$ and $V=[V_{m\ 1}]^T$ are 9×1 vectors for each sensor measurements. $V_m$ is a row vector comprising measurements from each LED illumination, or combinations of these illuminations. Z and V are vectors formed by augmenting the measurements with scalar value 1 to include an affine term. If quadratic or other terms are included, then the number of elements in these vectors and matrix M correspondingly increase.

To compute matrix M optimally for obtaining an estimated measurement $\hat{Z}$ for a color measured by the second sensor, a weighted least square criteria minimization is used. The optimal solution for matrix M, called M*, is obtained by minimizing the objective function defined as $$M^* = \arg\min_m J = \arg\min_m \sum_{i=1}^{N} w(i)\|Z_i - MV_i\|^2 \quad (2)$$

where $$w(i) = \frac{1}{d(i)^p + \varepsilon}; d(i) = \|Z_i - V_i\| \quad (3)$$

"p" is an integer number, and "ε" is a small positive constant. "i" represents the index for the personalization samples. "N" represents the total number of samples. Appropriate values for p and ε may be empirically determined. In most cases, P and ε can be zero. The solution to the above optimization problem can be easily obtained by setting the gradient of J with respect to M equal to zero. This results in $$M^* = QP^{-1} \quad (4)$$

where $$Q = \sum_{i=1}^{N} w(i) Z_i V_i^T \quad (5)$$

and $$P = \sum_{i=1}^{N} w(i) V_i V_i^T \quad (6)$$

Once M* is computed, the estimated measurement from the second sensor $\hat{Z}$ for any color in the original training set as measured by the reference LED sensor can be obtained by $$\hat{Z} = M^* V \quad (7)$$

We use equation 7 to personalize the training samples algorithmically instead of re-measuring them with each new sensor. Similar concept can be extended to build a personalized training set for the environment in which the sensor is located. In this case the personalization vector Z in equation 5 is obtained by measuring the color patches in the environment in which the sensor is used.

The spectral reconstruction matrix, A*, used in LED sensors are of size 31×9 elements. They are constructed for each cell by partitioning the reference database into clusters. These spectral reconstruction matrices are stored in the sensor instead of the training database and are multiplied by the sensor measurement vector (see equation 8 below) to construct spectra every time a new measurement is made.

$$\hat{S} = A^* V \quad (8)$$

For this type of use, personalized reconstruction matrices are obtained by multiplying the spectral reconstruction matrix by the inverse of the inter-instrument (or environmental sensor) matrix as follows:

$$A^*_{personalized} = A^* M^{-1} \quad (9)$$

If we personalize the training samples using equation 7, then adjustment of A matrix happens automatically in the spectral reconstruction algorithm. Otherwise, equation 9 is used. These are two different types of implementation considered for sensors depending on the hardware used for processing the sensor data.

A more detailed mathematical identification of the creation of the spectral reconstruction matrix, A* is identified in Published Application No. 2003/0055611A1, incorporated by reference above. The LED sensors whose operation are identified by such matrix are preferably of a size comprised of 31×9 elements and are constructed for each cell by partitioning the reference database into clusters as is also more particularly described in U.S. application Ser. No. 10/758,096, also incorporated by reference above. The spectral reconstruction matrices are stored in the sensors.

FIG. 2 shows the improved results that can be obtained after such sensor personalization.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

The invention claimed is:

1. A method for personalizing a reference database in a multiple LED spectrophotometer system comprising:

generating a set of reflectance reference measurements from a test target on to a reference sensor;

computing a spectral reconstruction reference matrix based on the operational characterization of the reference sensor from the set of reflectance reference measurements;

generating a set of reflectance measurements from a test target on to a subject sensor, wherein the set of reflectance measurements of the subject sensor has fewer elements than the set of reflectance reference measurements of the reference sensor;

computing a spectral reconstruction matrix based on the operational characterization of the subject sensor from the set of reflectance measurements, and adjusting the spectral reconstruction matrix by relating the set of reflectance measurements by the subject sensor to a set of corresponding reflectance reference measurements by the reference sensor, whereby the adjusting the spectral reconstruction matrix comprises computing a weighted least square minimization to generate an optimal solution spectral reconstruction matrix for the subject sensor;

generating the personalized reference database from the solution spectral reconstruction matrix; and computing a personalized spectral reconstruction matrix for characterizing operation of the subject sensor by adjusting the spectral reconstruction reference matrix in accordance with the optimal solution spectral reconstruction matrix.

2. The method of claim 1 wherein the computing the optimal solution spectral reconstruction matrix comprises using a weighted least squares criteria minimization.

3. A method for building a representative model of operation of a subject sensor in a multiple LED spectrophotometer system, comprising:

building a reference model of operation for a reference sensor by sensing a first plurality of reflectance measurements from training samples generated from a plurality of different LED emissions, building a model of operation for the subject sensor by sensing a second plurality of reflectance measurements, and wherein the second plurality of reflectance measurements is fewer in number than the first plurality;

adjusting the subject model utilizing the reference model wherein the adjusted subject model comprises an optimal subject sensor model computed from a weighted least squares minimization of the second plurality of reflectance measurements; and, adjusting the reference model with the optimal subject sensor model for building a personalized subject sensor model.

4. The method of claim 3 wherein the adjusting the subject model comprises processing the differences between the measurements for the subject sensor and the measurements from the reference sensor with a weighted least squares criteria minimization.

* * * * *